UNITED STATES PATENT OFFICE.

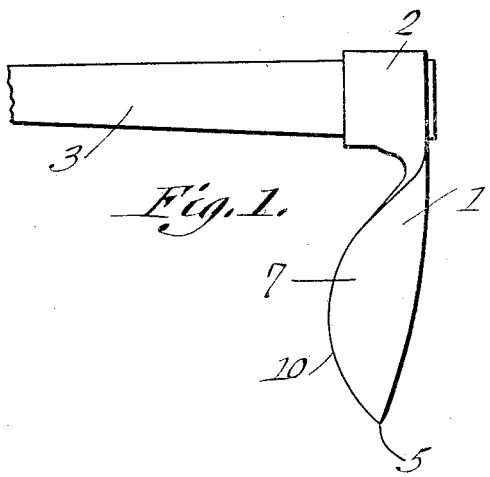
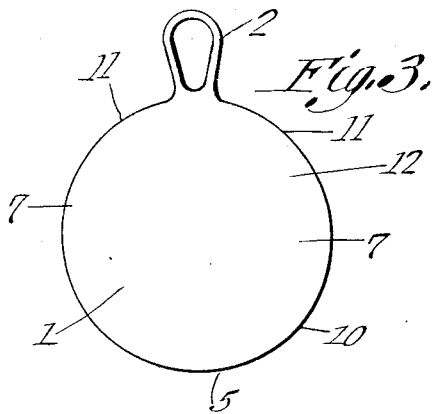
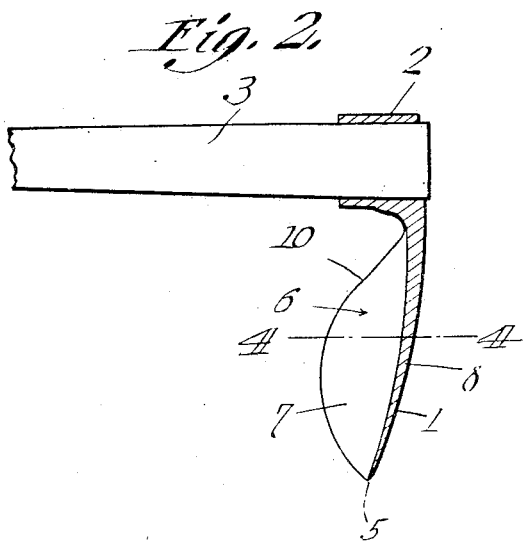
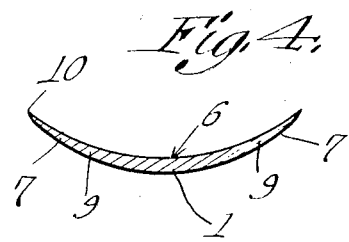

LIVY P. LANDRUM, OF HEREFORD, TEXAS.

SHOVEL-DIGGER.

1,371,494.  Specification of Letters Patent.  Patented Mar. 15, 1921.

Application filed September 12, 1918. Serial No. 253,752.

*To all whom it may concern:*

Be it known that I, LIVY P. LANDRUM, a citizen of the United States, residing at Hereford, in the county of Deaf Smith and State of Texas, have invented a new and useful Shovel-Digger, of which the following is a specification.

The device forming the subject matter of this application is a tool adapted to be employed as a digger, a pick, a cutter and the like, and the invention aims to provide a simple tool embodying the features above alluded to.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a tool constructed in accordance with the invention; Fig. 2 is a longitudinal section, wherein the handle appears in elevation; Fig. 3 is a top plan of the blade and the eye; Fig. 4 is a cross section on the line 4—4 of Fig. 2.

Referring to Figs. 1 to 4 both inclusive, the implement forming the subject matter of this application includes a blade 1, an eye 2 at the edge of the blade and a handle 3 in the eye 2, the handle being disposed approximately at right angles to the blade. The blade 1 is concaved longitudinally, as shown at 4, from the eye 2 to a point 5 on the periphery of the blade opposite to the eye. The blade 1 is concaved transversely, as shown at 6, to form upstanding wings 7, the blade being tapered as indicated at 8, in thickness, from the eye 2 to the point 5 opposite to the eye. Further, the blade 1 is tapered in thickness transversely, from the outer edge of one wing 7 to the outer edge of the opposite wing, the tapering indicated at 8 and at 9 serving to give the blade a sharpened cutting margin 10. The blade may be in the form of a true circle, as shown at 12 in Fig. 3, to fashion, on each side of the eye 2, cutting edges 11 which are effective on a back stroke.

The tool hereinbefore described is capable of many uses. It may be used as a pick, to loosen dirt, as a shovel, to remove dirt, as a cutter for severing roots and as a trench digging tool. The dirt carried on the blade 1 will be held thereon by the side wings 7. The forward stroke will fill the blade with dirt, and a back stroke will fill the blade with dirt, since, if the blade is in the form of a true circle, the portions of edge indicated at 11 adjacent the eye 2, will be effective on a back strike. The tool may be used for lifting dirt out of a hole and for many other purposes which will suggest themselves to the operator. The blade 1, of course, is fashioned from metal, and a good grade of steel is preferred.

Having thus described the invention, what is claimed is:—

A combined shovel and digger comprising a blade provided at its edge with an eye, and a handle in the eye, the handle being disposed approximately at right angles to the blade, the blade being in the form of a true circle, to fashion on each side of the eye, prominently presented convexed cutting edges which are effective when a back stroke is made, the blade being tapered in thickness from the eye to a point diametrically opposite to the eye, and being tapered in thickness from its central portion to its margin, to give the blade a cutting edge at its periphery, the blade being concaved longitudinally from the eye to said point, and being concaved transversely to form upstanding side wings.

In testimony that I claim the foregoing as my own, I have hereto affixed my signature in the presence of two witnesses.

LIVY P. LANDRUM.

Witnesses:
S. J. DODSON,
J. M. BOONE.